(12) United States Patent
Ko et al.

(10) Patent No.: US 7,520,176 B1
(45) Date of Patent: Apr. 21, 2009

(54) METHOD FOR REAL-TIME STRUCTURE SHAPE-SENSING

(75) Inventors: William L. Ko, Lancaster, CA (US); William Lance Richards, Palmdale, CA (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 246 days.

(21) Appl. No.: 11/567,118

(22) Filed: Dec. 5, 2006

(51) Int. Cl.
*G01N 3/00* (2006.01)
*G01L 1/24* (2006.01)

(52) U.S. Cl. ........................... 73/794; 73/800
(58) Field of Classification Search .................. 73/794, 73/800, 784
See application file for complete search history.

(56) References Cited

U.S. PATENT DOCUMENTS

| | | | | |
|---|---|---|---|---|
| 4,648,274 A | * | 3/1987 | Trainer | .................... 73/514.26 |
| 4,712,004 A | * | 12/1987 | Spillman, Jr. | ............ 250/208.5 |
| 5,285,019 A | * | 2/1994 | Kempf et al. | .................. 177/16 |
| 5,798,521 A | | 8/1998 | Froggatt | |
| 6,566,648 B1 | | 5/2003 | Froggatt | |
| 2001/0019103 A1 | * | 9/2001 | Sugai et al. | ............ 250/227.18 |

OTHER PUBLICATIONS

"Fiber Optic Measurement of Towed Array Shape," Office of Naval Research/University of Maryland; http://www.spa.com/aedp_ta.htm, 2004.

* cited by examiner

*Primary Examiner*—Max Noori
(74) *Attorney, Agent, or Firm*—Mark Homer (57) ABSTRACT

The invention is a method for obtaining the displacement of a flexible structure by using strain measurements obtained by stain sensors. By obtaining the displacement of structures in this manner, one may construct the deformed shape of the structure and display said deformed shape in real-time, enabling active control of the structure shape if desired.

17 Claims, 5 Drawing Sheets

Non-uniform cantilever beam instrumented with bending and distortion strain sensors.

Figure 1

Figure 2. Tapered wing box instrumented with two parallel bending strain-sensor lines.

Figure 3 Aircraft fuselage instrumented with bending and torsion strain sensors.

Figure 5 Non-uniform cantilever beam instrumented with bending and distortion strain sensors.

METHOD FOR REAL-TIME STRUCTURE SHAPE-SENSING

STATEMENT OF GOVERNMENT INTEREST

The invention described herein may be manufactured and used by or for the Government of the United States of America for governmental purposes without payment of any royalties thereon or therefor.

BACKGROUND OF THE INVENTION

1. Field of the Invention

This invention relates in general to determining the deformed shape of complex structures using stain sensor measurements in real-time and more particularly to employing closed-form analytical solutions in conjunction with strain sensors to determine the deflection of complex structures of real-time.

2. Description of the Related Art

Resistive strain gauges have been employed for many years in experimental stress analysis in order to determine the stress-state produced in structures subjected to thermal and mechanical loads. More recently other sensors, such as those employing fiber optics, including fiber Bragg grating sensors, have also been used for the same purpose and for structural health and usage monitoring. Strain sensors measure the local strain in the plane of the structural surface to which the sensors are attached. These types of sensors, in conjunction with simple algorithms provide a straight-forward and tractable methodology for determining the stress in structures. Conversely, a simple and straight forward approach for determining the out-of-plane structural displacement is not available, especially for lightweight highly flexible and complex structures.

Therefore, it is desired to provide a method of obtaining both in-plane strain and out-of-plane displacements simultaneously for complex, flexible structures. Further, it is desired to obtain these measurements in real-time.

SUMMARY OF THE INVENTION

The invention proposed herein comprises a method for obtaining the out-of-plane deformations (i.e. structural deformations due to bending) of a flexible structure by using strain measurements obtained by strain sensors. By obtaining the displacement of structures in this manner, one may construct the deformed shape of the structure and display said deformed shape in real-time, enabling active control of the structure shape if desired.

Accordingly, it is an object of this invention to provide a method for obtaining displacement of a flexible structure.

It is a further object of this invention to provide a method of using strain sensor measurements to obtain displacement of a flexible structure.

It is yet a further object of this invention to provide a method to obtain near real-time displacement of a flexible structure.

This invention meets these and other objectives related to deformation measurements by providing a method for obtaining displacement of a structure having an axis and length. The method comprises the steps of first, dividing the structure into a plurality of sections having equal lengths. Strain sensors are placed adjacent to each section so one can get strain measurements related to each section of the structure. The strain measurements for each section of the structure are used to calculate the displacement by using analytical closed-form methods (classical bending beam theory) that employ the length of the structure, the distance of the strain sensors from the axis of the structure, and the section length.

BRIEF DESCRIPTION OF THE DRAWINGS

In the drawings, which are not necessarily to scale, like or corresponding parts are denoted by like or corresponding reference numerals.

DESCRIPTION OF PREFERRED EMBODIMENTS

The invention, as embodied herein, comprises a method of obtaining displacement of a flexible structure by using strain measurements taken along the structure. For the present invention, the term displacement is defined as deformation of a structure out of the plane of the structure as applied to the structure's neutral axis. The term neutral axis is defined as the axis obtained by determining the axis or center point at each cross section of the structure.

Many technologies that employ flexible structures, particularly those that are relatively light-weight, can benefit from near real-time displacement data. These include high-aspect ratio flexible structures, aircraft wings (e.g. UAVs), rotocraft vehicles, space vehicles, wind turbine blades for the alternative energy community, space-based structures (booms and antenna), and long-span civil structures (bridges, dams). Since local strain is used as an input to the structural deformation method described herein, this method serves multiple purposes of structural shape sensing, loads monitoring, and structural health monitoring.

Displacement Theory

In general, the present invention employs a method of converting strain data obtained via strain sensors to get displacement data for flexible structures. To set forth the general theory of the conversion, the basic displacement equations will be developed for the weak nonuniform cantilever beam (e.g. Helios wing uniform tubular spar as limit case) subjected to bending, torsion, and combined bending and torsion are developed and described below.

Bending

The formulation of the displacement theories is built upon the classical beam differential equation (elastic curvature of deformed uniform beam) is given below $$\frac{d^2 y}{dx^2} = \frac{M(x)}{EI} \tag{1}$$

where y is the vertical displacement, x is the span-wise coordinate, M(x) is the bending moment, E is the Young's modulus, I is the moment of inertia.

At any beam cross-section x, the bending moment M(x) in equation (1) may be related to the bending strain $\epsilon(x)$ at the beam bottom (or top) fiber as $$M(x) = EI\frac{\epsilon(x)}{c} \qquad (2)$$

where c is the beam half depth.

In light of equation (2), equation (1) becomes $$\frac{d^2y}{dx^2} = \frac{\epsilon(x)}{c} \qquad (3)$$

Note that, under the present strain formulation, the beam differential equation (3) contains only the beam half depth c and the bending strain $\epsilon(x)$. The flexible rigidity term EI is eliminated. The beam differential equation (3) for the uniform beam could be used with sufficient accuracy for weak non-uniform beams. Namely, the beam half-depth c is no longer constant but a weak function of x [i.e., c=c(x)]. Hence, for the weak non-uniform beam, equation (3) may be modified to $$\frac{d^2y}{dx^2} = \frac{\epsilon(x)}{c(x)} \qquad (4)$$

The formulation of the present displacement theory for the non-uniform beams is based upon the modified beam differential equation (4).

Figure 1:
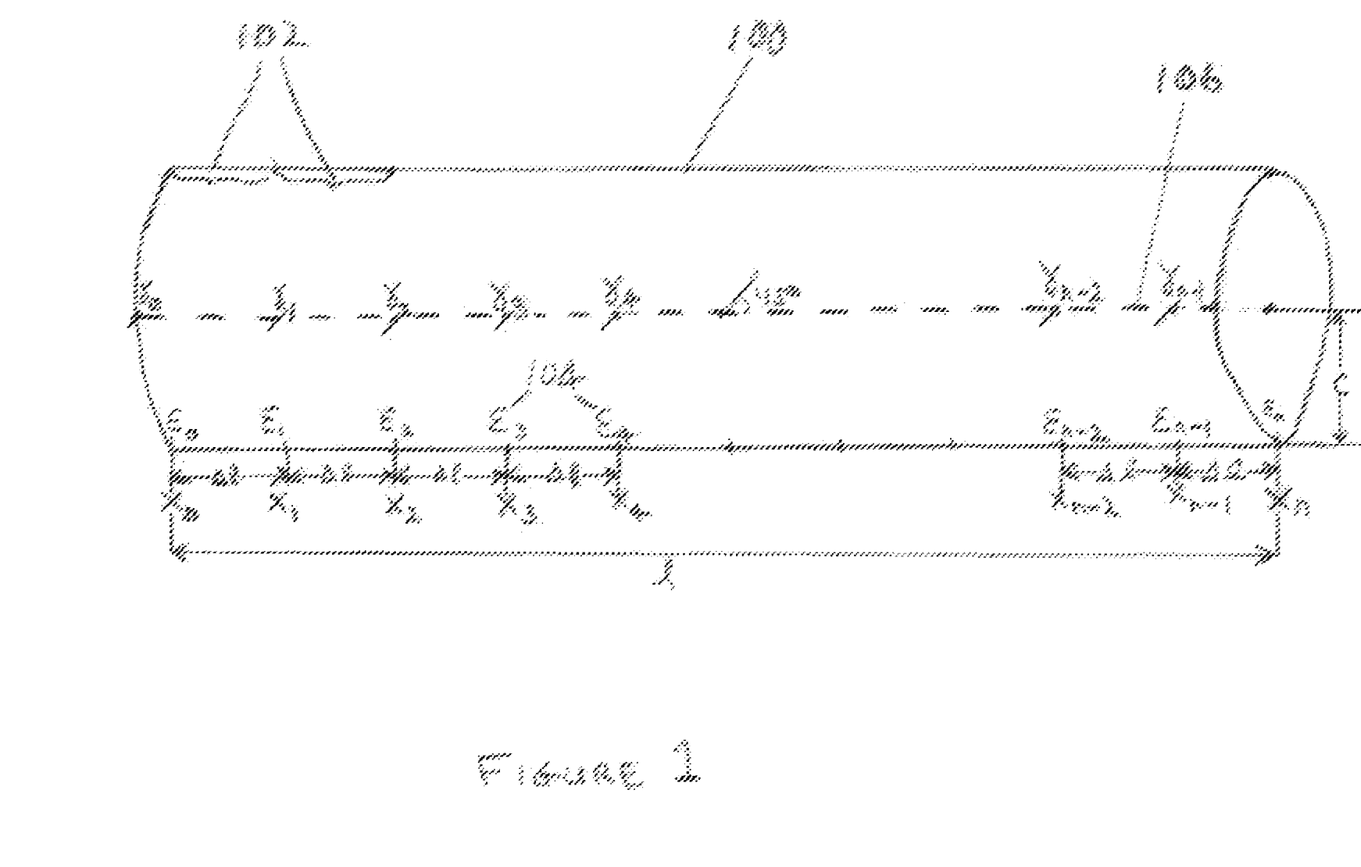
FIG. 1 depicts a cylinder structure to which the present invention method may be employed.

The non-uniform beam may be considered as a piecewise tapered beam (either tapering down or tapering up within each segment). FIG. 1 shows the uniform cantilever beam (special case of non-uniform beam) with length l and weakly varying beam-depth 2c(x). The beam is installed with n+1 equally spaced strain sensors at the sensing cross station $x_i$ (i=0, 1, 2, 3, ..., n) on the bottom surface of the beam. Thus, the beam is divided into n sections of equal length, $\Delta l = l/n$. Each beam section may then be considered as a linearly tapered beam section (either tapering down or tapering up within the section). Therefore, within the region $x_{i-1} < x < x_i$ between the two adjacent sensing stations $\{x_{i-1}, x_i\}$ at $\Delta l(=x_i-x_{i-1}=l/n)$ distance apart, the beam half-depth c(x) and the bending strain $\epsilon(x)$ may be expressed as linearly decreasing (or increasing) function of x as $$c(x) = c_{i-1} - (c_{i-1} - c_i)\frac{x - x_{i-1}}{\Delta l}; \quad x_{i-1} < x < x_i \qquad (5)$$

$$\epsilon(x) = \epsilon_{i-1} - (\epsilon_{i-1} - \epsilon_i)\frac{x - x_{i-1}}{\Delta l}; \quad x_{i-1} < x < x_i \qquad (6)$$

where $\{c_{i-1}, c_i\}$ and $\{\epsilon_{i-1}, \epsilon_i\}$ are respectively the values of c(x) and $\epsilon(x)$ at the sensing stations $\{x_{i-1}, x_i\}$.

Slope Equations

The slope $\tan\theta_i$ at the strain sensing station $x_i$ may be obtained by integrating equation (4) once between $x_{i-1}$ and $x_i$ as $$\tan\theta_i = \int_{x_{i-1}}^{x_i} \frac{\epsilon(x)}{c(x)} dx + \tan\theta_{i-1} \qquad (7)$$

in which $\tan\theta_{i-1}$ is the beam slope at the sensing station $x_{i-1}$.

Substituting the beam depth equation (5) and strain equation (6) into the slope equation (7), and after performing integration, one obtains $$\tan\theta_i = \frac{\Delta l}{2c_{i-1}}\left[\left(2 - \frac{c_i}{c_{i-1}}\right)\epsilon_{i-1} + \epsilon_i\right] + \tan\theta_{i-1} \qquad (8)$$

$$(i = 1, 2, 3, \ldots, n)$$

When i=1, $\tan\theta_0(=0)$ will be the slope at the built-in end reference sensing station $x_0$.

Deflection Equations

The deflection $y_i$ at the strain sensing station $x_i$ may be obtained by carrying out double integration of equation (4) as $$y_i = \int_{x_{i-1}}^{x_i} \int_{x_{j-1}}^{x} \frac{\epsilon(x)}{c(x)} dx\,dx + y_{i-1} \qquad (9)$$

in which $y_{i-1}$ is the beam deflection at the sensing station $x_{i-1}$.

In light of the beam depth equation (5) and strain equation (6), the deflection equation (9) may be integrated twice to yield $$y_i = \frac{(\Delta l)^2}{6c_{i-1}}\left[\left(3 - \frac{c_i}{c_{i-1}}\right)\epsilon_{i-1} + \epsilon_i\right] + y_{i-1} + \Delta l \tan\theta_{i-1} \qquad (10)$$

$$(i = 1, 2, 3 \ldots n)$$

When i=1, $y_0 = \tan\theta_0 = 0$ at the built-in end reference sensing station $x_0$.

Combining equations (8) and (10), and using the recursion relationships, the deflection equation (10) becomes:

Non-Uniform Beams $$y_i = \qquad (11)$$

$$\frac{(\Delta l)^2}{6}\sum_{j=1}^{i} \frac{1}{c_{j-1}}\left\{\left[3(2j-1) - (3j-2)\frac{c_{i-j+1}}{c_{i-j}}\right]\epsilon_{i-j} + (3j-2)\epsilon_{i-j+1}\right\} +$$

$$y_0 + i\Delta l \tan\theta_0$$

$$(i = 1, 2, 3, \ldots, n)$$

Uniform Beams (Limit Case)

$$y_i = \frac{(\Delta l)^2}{6c}\left[(3i-1)\epsilon_0 + 6\sum_{j=1}^{i-1}(i-j)\epsilon_j + \epsilon_i\right] + y_0 + \tan\theta_0 \qquad (12)$$

$$(i = 1, 2, 3, \ldots, n)$$

Torsion

Figure 3:
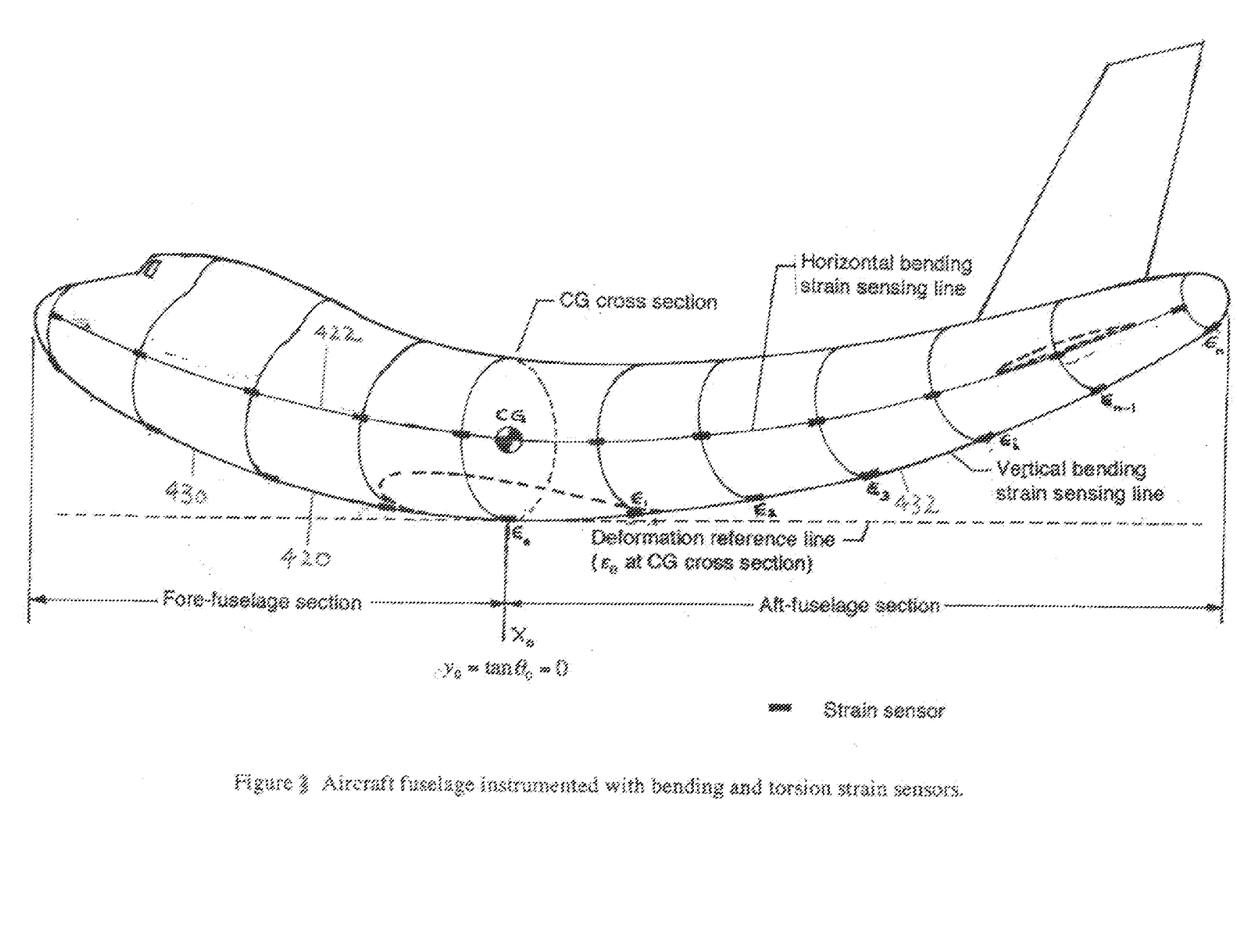
FIG. 3 depicts an aircraft fuselage structure to which the present invention may be employed.

Similarly for torsion, Let $T_i$ be the twisting moment at the distortion sensing station $x_i$, and let $y_i$ be the associated local surface angle of twist (shear strain) at the distortion sensing station $x_i$ in relation to the distortion sensing station $x_{i-1}$ (FIG. 3), then the torque/distortion relationship may be written as $$\gamma_i = \frac{T_i c}{GJ} \quad (13)$$

where G is the shear modulus, and J is the polar moment of inertia, and c is the outer radius of the structural member. The surface distortion $y_i$ (shear strain) is to be obtained from the distortion sensors as $$\gamma_i = \frac{(\tau_{max})_i}{G} = \frac{\sigma_i^p}{G} = \frac{E}{G}\varepsilon_i^p = 2(1+\nu)\varepsilon_i^p \quad (14)$$

The cross sectional twist angle $\phi_i$ at sensing cross section $x_i$ may then be calculated from $$\phi_i = \frac{\Delta l}{c}(\gamma_0 + \gamma_1 + \gamma_2 + \ldots + \gamma_{i-1}) \quad (15)$$

Combined Bending and Torsion

In order to obtain the true bending strain $\bar{\epsilon}_i$, the value of measured strain $\epsilon_i$ must be corrected by using the following bending strain correction equation.

$$\bar{\varepsilon}_i = \frac{\varepsilon_i}{\cos\phi_i \cos\gamma_i} \quad (16)$$

where the surface twist angle $y_i$ and the cross sectional twist angle $\phi_i$ are to be calculated respectively from previous equations and input into the following equation

Non-Uniform Beams $$y_i = \frac{(\Delta l)^2}{6}\sum_{j=1}^{i}\frac{1}{c_{j-1}}\left\{\left[3(2j-1) - (3j-2)\frac{c_{i-j+1}}{c_{i-j}}\right]\bar{\varepsilon}_{i-j} + (3j-2)\bar{\varepsilon}_{i-j+1}\right\} + y_0 + i\Delta l\tan\theta_0 \quad (17)$$

$(i = 1, 2, 3, \ldots, n)$

Uniform Beams (Limit Case)

$$y_i = \frac{(\Delta l)^2}{6c}\left[(3i-1)\bar{\varepsilon}_0 + 6\sum_{j=1}^{i-1}(i-j)\bar{\varepsilon}_j + \bar{\varepsilon}_i\right] + y_0 + \tan\theta_0 \quad (18)$$

Writing out equation (17) explicitly for different indices i for displaying functional behavior, there results.

$$y_1 = \frac{(\Delta l)^2}{6c_0}\left[\left(3 - \frac{c_1}{c_0}\right)\varepsilon_0 + \varepsilon_1\right] + y_0 + \Delta l\tan\theta_0 \quad (17\text{-a})$$

$$y_2 = \frac{(\Delta l)^2}{6c_1}\left[\left(3 - \frac{c_2}{c_1}\right)\varepsilon_1 + \varepsilon_2\right] + \frac{(\Delta l)^2}{6c_0}\left[\left(9 - 4\frac{c_1}{c_0}\right)\varepsilon_0 + 4\varepsilon_1\right] + y_0 + 2\Delta l\tan\theta_0 \quad (17\text{-b})$$

$$y_3 = \frac{(\Delta l)^2}{6c_2}\left[\left(3 - \frac{c_3}{c_2}\right)\varepsilon_2 + \varepsilon_3\right] + \frac{(\Delta l)^2}{6c_1}\left[\left(9 - 4\frac{c_2}{c_1}\right)\varepsilon_1 + 4\varepsilon_2\right] + \frac{(\Delta l)^2}{6c_0}\left[\left(15 - 7\frac{c_1}{c_0}\right)\varepsilon_0 + 4\varepsilon_1\right] + y_0 + 3\Delta l\tan\theta_0 \quad (17\text{-c})$$

$$y_4 = \frac{(\Delta l)^2}{6c_3}\left[\left(3 - \frac{c_4}{c_3}\right)\varepsilon_3 + \varepsilon_4\right] + \frac{(\Delta l)^2}{6c_2}\left[\left(9 - 4\frac{c_3}{c_2}\right)\varepsilon_2 + 4\varepsilon_3\right] + \frac{(\Delta l)^2}{6c_1}\left[\left(15 - 7\frac{c_2}{c_1}\right)\varepsilon_1 + 7\varepsilon_2\right] + \frac{(\Delta l)^2}{6c_0}\left[\left(21 - 10\frac{c_1}{c_0}\right)\varepsilon_0 + 10\varepsilon_1\right] + y_0 + 4\Delta l\tan\theta_0 \quad (17\text{-d})$$

$$y_5 = \frac{(\Delta l)^2}{6c_4}\left[\left(3 - \frac{c_5}{c_4}\right)\varepsilon_4 + \varepsilon_5\right] + \frac{(\Delta l)^2}{6c_3}\left[\left(9 - 4\frac{c_4}{c_3}\right)\varepsilon_3 + 4\varepsilon_4\right] + \frac{(\Delta l)^2}{6c_2}\left[\left(15 - 7\frac{c_3}{c_2}\right)\varepsilon_2 + 7\varepsilon_3\right] + \frac{(\Delta l)^2}{6c_1}\left[\left(21 - 10\frac{c_2}{c_1}\right)\varepsilon_1 + 10\varepsilon_2\right] + \frac{(\Delta l)^2}{6c_0}\left[\left(27 - 13\frac{c_1}{c_0}\right)\varepsilon_0 + 13\varepsilon_1\right] + y_0 + 5\Delta l\tan\theta_0 \quad (17\text{-e})$$

...

At the beam – tip $(i = n)$:

$$y_n = \frac{(\Delta l)^2}{6c}\sum_{j=1}^{n}\frac{1}{c_{j-1}}\left\{\left[3(2j-1) - (3j-2)\frac{c_{n-j+1}}{c_{n-j}}\right]\varepsilon_{n-j} + (3j-2)\varepsilon_{n-j+1}\right\} + y_0 + n\Delta l\tan\theta_0 \quad (17\text{-f})$$

in which the built-in condition $y_0 = \tan\theta_0 = 0$ holds.

Equations (17-a)-(17-f) explicitly show that the deflection $y_i$ ($i = 1, 2, 3, \ldots, n$) is obtained by summing up the geometrical and strain data evaluated at the inboard strain sensing locations ($x_0, x_1, x_2, \ldots, x_i$) including the current strain sensing location $x_i$. By obtaining the deflection at all of the strain sensing locations, one may thereby generate the deformed shape of the tapered cantilever beam such as an aircraft wing.

It is important to mention that the deflection equation (17) developed for slightly non-uniform beam can now be used for the uniform beam case by setting $c_{i-1} = c_i$ as a limit case.

In general, the present invention includes the following steps:

1. A structure is selected in which strain and displacement measurements are required. These can be classic structural configurations, such as beams, plates, shells, tubes, etc. or structures of complex configurations, such as tapered beams, wing foils, space-based antenna, wind turbine blades, rotocraft blades, and other complex structures.

2. Discretize the spatial domain of the structure by dividing the structure into sections, spaced at constant distances apart.

3. Install strain sensors on the surface of the structure so that the sensors are located adjacent to each of the sections defined in step 2. The strain sensors preferably are placed equidistant from each other.

4. Measure the strain at each section using the strain sensors located along the surface of the structure.

5. Convert the strain data into displacement data employing analytical closed-form methods (classical beam bending theory) that employ the length of the structure, the distance of each strain sensor from the neutral axis of the structure at its location, and the section length.

6. Optionally plot the deflection data at the strain sensor locations to construct the deformed shape of the structure to display the deformed shape in real-time or to input the deformed shape into a control system to actively control the shape of the structure.

In order to practice the present invention, strain sensors must be placed on the structure at issue. While any type strain sensors that accurately measure strain on a structure (for example, strain gauges), may be employed in the present invention, it is preferred that a light-weight strain sensor, such as those using fiber-optic technologies, be used. This is because many of the structures named above, that might employ the present invention, are relatively light-weight and flexible themselves.

Preferably, fiber optic sensors are employed in the present invention. The most preferred strain sensor to practice the present invention are Fiber Bragg Grating (FBG) sensors. These sensors are preferred because they are minimally obtrusive, ultra-lightweight, easily installed, accurate, immune to EMI, and inherently-safe (no joule heating, sparking). The most preferred configuration and use of FBG sensors for the present invention employ the Optical Frequency Domain Reflectometry (OFDR) technique with hardware architecture described in U.S. Pat. No. 5,798,521 and U.S. Pat. No. 6,566,648 which are incorporated herein by reference. This approach uses low reflectivity gratings all with the same center wavelength and a tunable laser source. The FBGs are preferably located on a single optical fiber. This allows hundreds of strain sensors to be located down the length of the fiber, a common configuration is to use 480 FBGs on a single fiber spaced at 1 FBG/cm. This configuration allows strain measurements to be acquired at much higher spatial resolution than other current senor technologies, making it flexible enough to employ a user-selected grating density depending on the type of application.

The general approach described herein may be employed on both simple and realistic, complex structures, such as aircraft wings, as well as a wide-variety of complex structures which vary spatially in all three Cartesian coordinates (x,y,z), for example tapered beams, which vary in all three axes, plates of nonuniform thickness, hollow tubes, beams, columns, shells, etc.

Also, this approach, unlike many prior art approaches for gauging structural changes, is not material independent. It does not depend of the material properties of the substrate such as modulus of elasticity. Poisson's ratio, bulk modulus, etc. Therefore no pre-test calibrations or advanced knowledge about these complex conditions is needed to practice the present invention.

The method of the present invention is also completely independent of applied loads (concentrated, distributed) and boundary conditions being applied to the structures at issue. The invention can operate on structures under any general loading conditions including moments/forces, which are spatially nonuniform. The invention may also be used on any of classical beam/plate/shell boundary conditions such as fixed ends, simply-supported, flexible supports, etc, or any general condition in-between without any dependence on heterogeneous boundary conditions in order to simplify the closed form solution.

Further, the invention does not apply the typical assumptions required to solve classical analytical linear partial differential equations. Such assumptions significantly reduce the types of structures that may be assessed.

A specific example of the present invention is described below. Referring to FIG. 1, using a simple cylinder 100 of length, l, and radius, c, the sections 102 are defined to be $\Delta l$ distances apart.

Strain sensors 104 (e.g. strain gages, fiber Bragg gratings, etc.) on the surface of distance c from the neutral axis 106 down the length of the structure 100 so that a strain sensors 104 are located adjacent to the sections 102.

Assuming a specific case in which the cylinder 100 is subjected to lateral loads only, which produce bending in the cylinder 100, then the displacements due to bending at $y_i$ can be calculated by inputting the cylinder's 100 length, l, the distance the sensors 104 are away from the neutral axis 106, c, the spacing distance $\Delta l$, and the measured strains at each section 102, $\epsilon_i$, into the following generalized equation in which the thickness of the structure varies from station to station in the x direction (i.e. c is nonuniform as a function of x)

$$y_i = \frac{(\Delta l)^2}{6} \sum_{j=1}^{i} \frac{1}{c_{j-1}} \left\{ \left[ 3(2j-1) - (3j-2)\frac{c_{i-j+1}}{c_{i-j}} \right] \varepsilon_{i-j} + (3j-2)\varepsilon_{i-j+1} \right\} + y_0 + i\Delta l \tan\theta_0 \quad (19)$$

$$(i = 1, 2, 3, \ldots, n)$$

Since c(x)=constant for cylinder 100, then equation 19 reduces to $$y_i = \frac{(\Delta l)^2}{6c} \left[ (3i-1)\varepsilon_0 + 6\sum_{j=1}^{i-1} (i-j)\varepsilon_j + \varepsilon_i \right] + y_0 + \tan\theta_0 \quad (20)$$

$$(i = 1, 2, 3, \ldots, n)$$

By plotting the deflections $y_i$, (i=1, 2, 3, ..., n) at the strain sensing sections $x_i$, the deformed shape of the cylinder 100 may be constructed, and could be either be displayed for real time deformation status or input into the control system to actively control shape.

The above example assumes that the out-of-plane displacements being determined are produced by loads applied normal to the structural surface and that the in-plane strains are very low. This assumption is reasonable for a plethora of structural configurations such as wings, cantilevered beams, turbine blades, pressure bulkheads, etc. If this assumption is not valid, the invention may still be used by employing two sensor sets located on the top and bottom surfaces of the structure. This configuration allows a user to take the mean of the strain measurement of the top and bottom sensors at each section of the structure and input the mean value into the appropriate conversion formula. This technique then effectively eliminates the unwanted in-plane strain contribution at each section number produced in the structure by in-plane loads.

Figure 5:
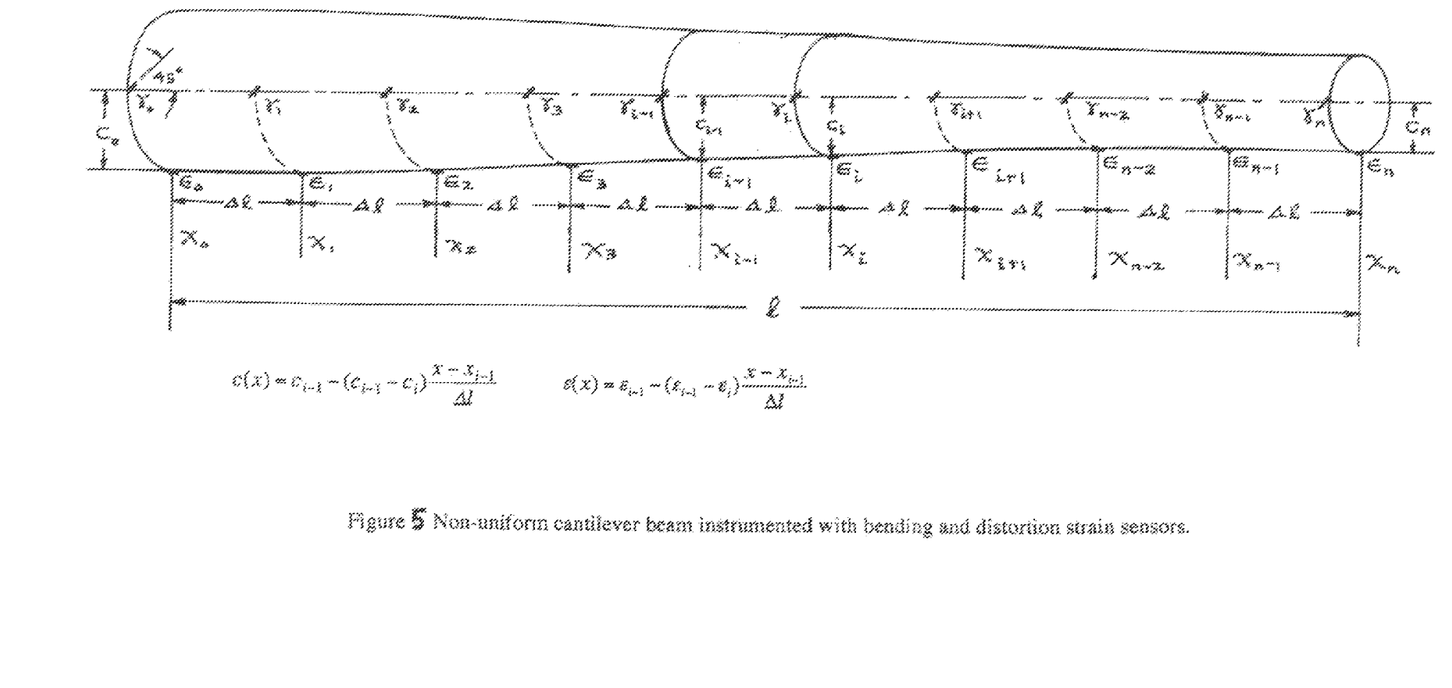
FIG. 5 depicts a non-uniform cantilever beam structure to which the present invention may be employed.

FIG. 5 shows a non-uniform cantilevered beam. Equation 19 would be employed to practice the present invention in lieu of equation 20, as described in the above example.

In addition to the examples of conversion equations developed and discussed above, the deformations of a multitude of other structures can be solved using the same basic equations 19 or 20 above. Following are examples for complex structures.

APPLICATION TO WING BOXES

Figure 2:
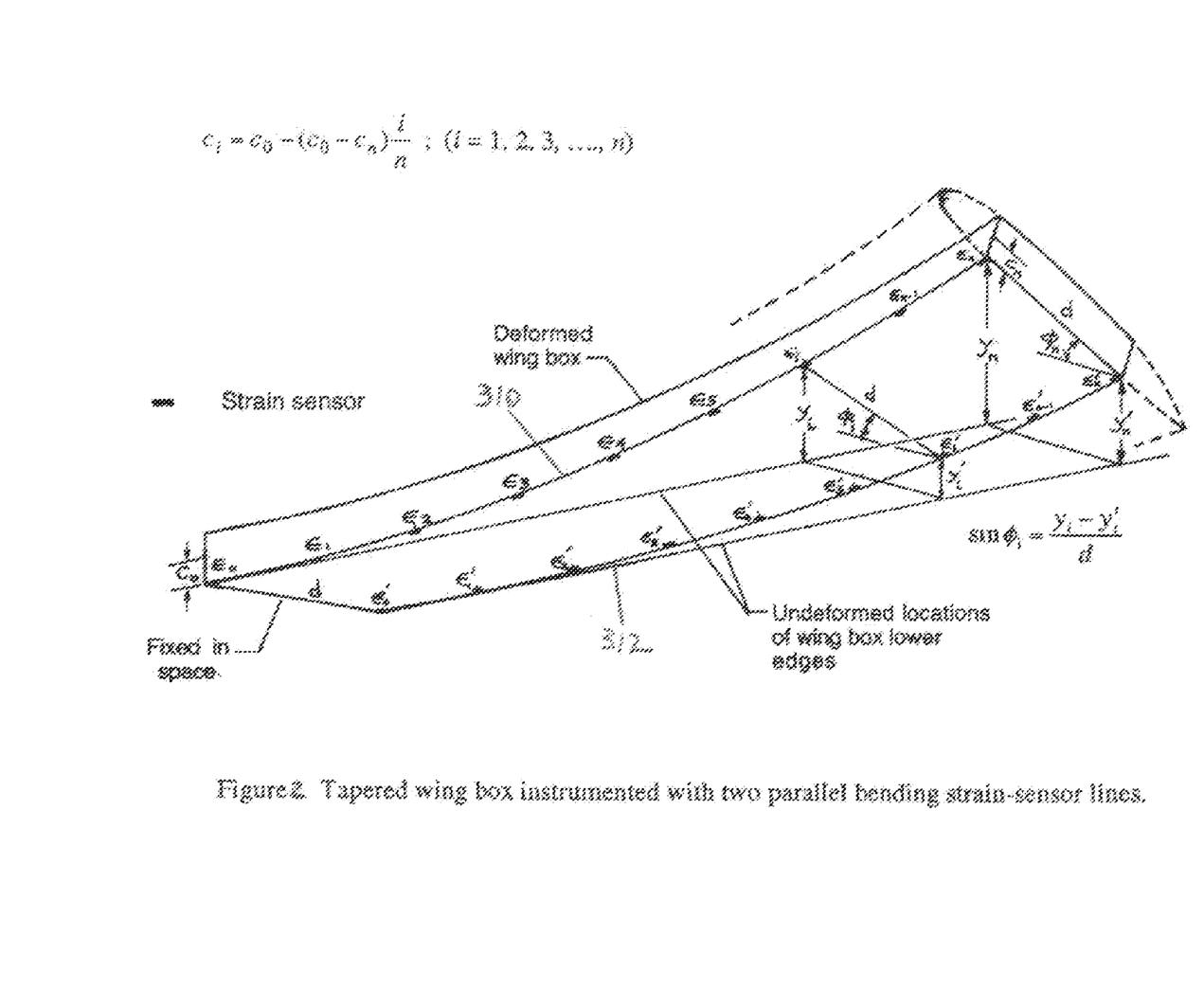
FIG. 2 depicts a wing-box structure to which the present invention may be employed.

For the installations of strain sensors for a wing box-like structure under combined bending and torsion, two bending strain sensor lines may be used each as input to the basic equation. FIG. 2 shows a wing box under combined bending and torsion. The wind box is a type of a slightly tapered cantilever beam. The two bending strain sensing lines system is a simple way to simultaneously monitor the wing box deflections and the wing box cross sectional twists. The two (front and rear) bending strain sensing lines 310, 312 are parallel, separated by a chord-wise distance of d, and are oriented in the span-wise direction.

1. Deflections

The deflections $\{y_i, y'_i\}$ of the front and rear sensing stations 310, 312 lying at the same span-wise sensing cross section $x_i$ ($i=0, 1, 2, 3, \ldots, n$) may be calculated from deflection equation (19) which is rewritten in the following for the front and the rear strain sensing stations.

For the front strain sensing line 310 equation x is:

$$y_i = \frac{(\Delta l)^2}{6} \sum_{j=1}^{i} \frac{1}{c_{i-j}} \left\{ \left[ 3(2j-1) - (3j-2)\frac{c_{i-j+1}}{c_{i-j}} \right] \varepsilon_{i-j} + (3j-2)\varepsilon_{i-j+1} \right\} + \quad (21)$$

$$y_0 + (i)\Delta l \tan\theta_0$$

$$(i = 1, 2, 3, \ldots, n); \quad y_0 = \Delta l \tan\theta_0 = 0$$

For the rear strain sensing line 312 equation $x$ is:

$$y'_i = \frac{(\Delta l)^2}{6} \sum_{j=1}^{i} \frac{1}{c_{i-j}} \left\{ \left[ 3(2j-1) - (3j-2)\frac{c_{i-j+1}}{c_{i-j}} \right] \varepsilon'_{i-j} + (3j-2)\varepsilon'_{i-j+1} \right\} + \quad (22)$$

$$y'_0 + (i)\Delta l \tan\theta'_0$$

$$(i = 1, 2, 3, \ldots, n); \quad y'_0 = \Delta l \tan\theta'_0 = 0$$

2. Cross Sectional Twists

If d denotes the chord-wise distance between the front and rear bending strain sensing lines 310, 312, then the cross sectional twist angle $\phi_i$ at any strain sensing cross section $x_i$ may be calculated from the following cross sectional twist angle equation.

$$\phi_i = \sin^{-1}\left(\frac{y_i - y'_i}{d}\right) \quad (i = 1, 2, 3, \ldots, n) \quad (23)$$

in which $\phi_0 = 0$ at the wing root. The deflections $\{y_i, y'_i\}$ may be calculated respectively from the deflection equations (21), (22) using the measured bending strain data as inputs. With the use of equation (23), installations of the distortion sensors are not required. An alterative method for the predications of the cross sectional twist angle $\phi_i$ for the wing box is discussed in the following example.

APPLICATION TO AIRCRAFT FUSELAGES

Referring to FIG. 3, an aircraft fuselage is a tubular shaped structure with varying cross sections. This kind of structure may be considered as a non-uniform unsupported free-free beam during flight. To measure the deformed shape of the airborne fuselage due to vertical and horizontal bending, and torsion, three sensing lines 420, 422, 424 are required. The bottom 420(belly) and side 422 sensing lines are to monitor the vertical and horizontal deflections respectively. The torsion sensing line (not depicted) may be installed either on the bottom (or side) surface parallel to the bottom (or side) bending sensing line.

In formulating the deflection equation (19) for a slightly non-uniform cantilever beam, duplicated below as equation (24):

$$y_i = \quad (24)$$

$$\frac{(\Delta l)^2}{6} \sum_{j=1}^{i} \frac{1}{c_{j-1}} \left\{ \left[ 3(2j-1) - (3j-2)\frac{c_{i-j+1}}{c_{i-j}} \right] \varepsilon_{i-j} + (3j-2)\varepsilon_{i-j+1} \right\} +$$

$$y_0 + (i)\Delta l \tan\theta_0$$

$$(i = 1, 2, 3, \ldots, n)$$

the reference strain sensing station $x_0$ is located at the built-in end. With the built-in condition $y_0 = \tan\theta_0 = 0$ imposed, equation (24) is also applicable to the moving cantilever beams because, the deflection $y_i$ calculated from equation (24) is relative to the tangent line ($\tan\theta_0 = 0$) stemming from the reference strain sensing station $x_0$ at the built-in end. Equation (24) may be applicable to the free-free unsupported moving fuselage case in the following fashion.

The fuselage may be considered as a free-free unsupported beam consisted of two non-uniform cantilever beams joined together at the center-of-gravity (CG) cross section. During flight, the CG cross section has the least movement comparing with other fuselage cross-sections. For practical purpose, it is ideal to choose the reference strain sensing station $x_0$ at the CG cross-section, and divide the strain sensing line into two segments 430, 432. One segment is for the forward-fuselage section and the other for the aft-fuselage section. Thus, by imposing $y_0 = \tan\theta_0 = 0$ at the reference sensing station $x_0$ (considered as a built-in end), deflection equation (24) for the cantilever beam may be used to calculate the deflections of the fore- and aft-fuselage sections. The calculate deflection $y_i$ calculated from the deflection will then be the relative deflection with respect to the tangent line passing though the reference sensing station $x_0$, which moves (translates and rotates) with the fuselage.

Figure 4:
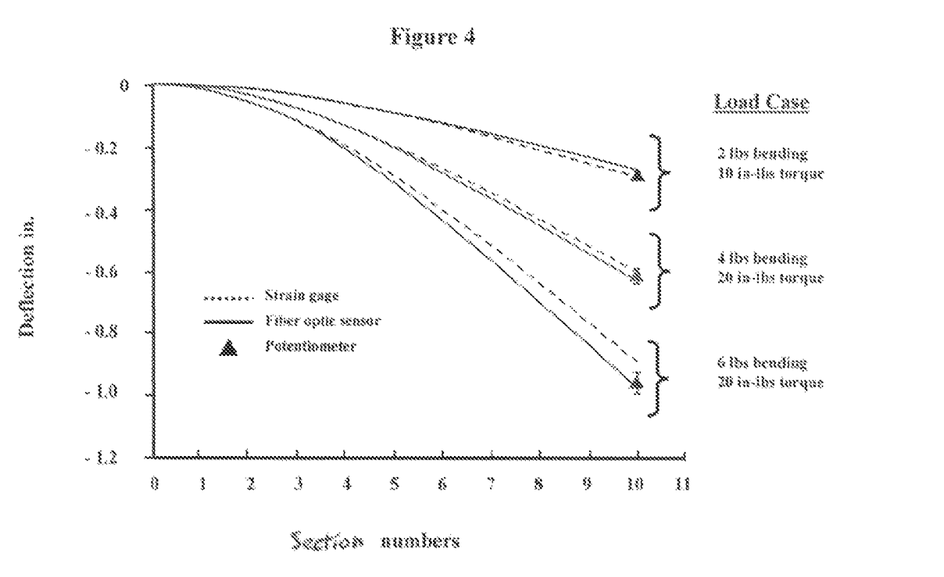
FIG. 4 depicts the results of testing the present invention on a cantilever beam structure.

The present invention was tested on a 10-ft long, thin-walled composite beam. Results are shown in FIG. 4 from cantilever beam testing for three combined load cases: 2-lbs bending/10 in-lbs torque, 4-lbs bending/20 in-lbs torque, and 6-lbs bending/20 in-lbs torque. For each load case, the deflection of the cantilever beam is shown using 1) strain gage measurements input into the strain/displacement equations, FBG strain sensors input into the strain/displacement equations, and direct measurements using potentiometers. Good agreement is shown in FIG. 4 for all three cases, thus validating the equations for cantilever beam deflection developed above.

What is described are specific examples of many possible variations on the same invention and are not intended in a limiting sense. The claimed invention can be practiced using other variations not specifically described above.

What is claimed is:

1. A method for obtaining displacement of a structure having a depth with a neutral axis and length, comprising the steps of:
    dividing the structure into a plurality of sections, the sections having equal lengths;
    providing strain sensors adjacent to each section;
    obtaining strain measurements from each strain sensor; and,
    calculating the displacements on the structure out of a plane from the neutral axis using the strain measurements, the structure length, the strain senor distance from the structure neutral axis, and the section length.

2. The method of claim 1, wherein the strain sensors comprise a location at a first end of each section, the locations defined as $x_0, x_1, x_2 \ldots x_n$, wherein n is the number of strain sensors and $x_0$ is located at a first end of the structure, $x_n$ is located at a second end of the structure, and the remaining strain sensors are located in numerical order between $x_0$ and $x_n$.

3. The method of claim 1, wherein the strain sensors comprise fiber optic sensors using a tunable light source.

4. The method of claim 3, wherein the strain sensors comprise fiber Bragg grating sensors.

5. The method of claim 4, wherein the fiber Bragg grating sensors are located along a single optical fiber on a surface of the structure.

6. The method of claim 5, wherein the sections comprise a minimum length of about once centimeter.

7. The method of claim 1, wherein the providing strain sensors step includes providing strain sensors adjacent to each section at a top and bottom location.

8. The method of claim 7, wherein the strain sensors are located along two optical fibers, a first optical fiber on a top surface of the structure and a second optical fiber on a bottom surface of the structure.

9. A method for obtaining displacement of a structure having a depth with a neutral axis and length, comprising the steps of:
    dividing the structure into a plurality of sections, the sections having equal lengths;
    providing strain sensors comprising a location at a first end of each section, the locations defined as $x_0, x_1, x_2 \ldots x_n$, wherein n is the number of strain sensors and $x_0$ is located at a first end of the structure, $x_n$ is located at a second end of the structure, and the remaining strain sensors are located in numerical order between $x_0$ and $x_n$;
    obtaining strain measurements from each strain sensor; and,
    calculating the displacements on the structure using the strain measurements, the structure length, the strain sensor distance from the structure neutral axis, and the section length further comprising calculating deflection at each strain sensor, defined as location $x_i$, by summing the strain measurement at location $x_i$ with the strain measurement at strain sensors at locations $x_0$ through $x_{i-1}$.

10. The method of claim 9, wherein the calculating step comprises the use of the algorithm:

$$y_i = \frac{(\Delta l)^2}{6} \sum_{j=1}^{i} \frac{1}{c_{j-1}} \left\{ \left[ 3(2j-1) - (3j-2)\frac{c_{i-j+1}}{c_{i-j}} \right] \varepsilon_{i-j} + (3j-2)\varepsilon_{i-j+1} \right\} +$$
$$y_0 + i\Delta l \tan\theta_0$$

where $y_i$ is the displacement at a strain sensor location $x_i$, $\Delta l$ is the distance between two adjacent strain sensors, l is the length of the structure, c is the distance from the strain sensor location and the neutral axis, and $\varepsilon$ is the measured strain at each strain sensor location.

11. The method of claim 10, wherein the distance from each strain sensor to the neutral axis is equal, resulting in the algorithm:

$$y_i = \frac{(\Delta l)^2}{6c} \left[ (3i-1)\varepsilon_0 + 6\sum_{j=1}^{i-1}(i-j)\varepsilon_j + \varepsilon_i \right] + y_0 + \tan\theta_0.$$

12. The method off claim 10, wherein the strain sensors comprise fiber optic sensors using a tunable light source.

13. The method of claim 12, wherein the strain sensors comprise fiber Bragg grating sensors.

14. The method of claim 13, wherein the fiber Bragg grating sensors are located along a single optical fiber on a surface of the structure.

15. The method of claim 14, wherein the sections comprise a minimum length of about once centimeter.

16. The method of claim 10, wherein the providing strain sensors step includes providing strain sensors adjacent to each section at a top and bottom location.

17. The method of claim 16, wherein the strain sensors are located along two optical fibers, a first optical fiber on a top surface of the structure and a second optical fiber on a bottom surface of the structure.

* * * * *